April 17, 1951 S. A. J. MANSTED 2,549,215
METHOD OF AND MEANS FOR PRODUCING BROKEN ICE
Filed Feb. 26, 1946 2 Sheets-Sheet 1

Inventor
S. A. J. Mansted
By Jacox K Downing Leekld
Attys.

April 17, 1951 S. A. J. MANSTED 2,549,215
METHOD OF AND MEANS FOR PRODUCING BROKEN ICE
Filed Feb. 26, 1946 2 Sheets-Sheet 2

Inventor
S. A. J. Mansted
By Glascock Downing Sutton
Attys.

Patented Apr. 17, 1951

2,549,215

UNITED STATES PATENT OFFICE 2,549,215

METHOD OF AND MEANS FOR PRODUCING BROKEN ICE

Svend Axel Jørgen Mansted, Copenhagen, Denmark

Application February 26, 1946, Serial No. 650,273
In Denmark July 30, 1942

Section 1, Public Law 690, August 8, 1946
Patent expires July 30, 1962

5 Claims. (Cl. 62—105)

The present invention relates to an improved method of and means for producing broken ice or ice chips, such as is employed as pack-ice for cooling perishable commodities during their despatch.

Such broken ice has hitherto been made by freezing a thin layer of water over a rotatable surface, and thereupon, during the rotation of the surface scraping the ice off in the form of scales by means of a suitable scraping implement. This manner of operation has, however, proved unsatisfactory owing to the fact that the frozen ice is exceedingly hard, and accordingly the sharp edge of the scraping implement is quickly blunted so that all the ice will not be removed from the frozen surface. To remedy this it has been proposed to remove the ice by means of rotatable cylinders provided with spikes, or cutters provided with knives. Spiked cylinders have been found to be less adaptable to the purpose than a strong rotatable cutter that divides the ice into small particles of uniform size, but such finely divided ice particles are only suitable for limited purposes.

The object of the present invention is, therefore, to provide a method including sharp or pointed implements by means of which it is possible in a comparatively simple manner to produce broken ice that is suitable for all purposes to which such ice is usually put. Another object of the invention is to provide means for carrying out the method, which means include the employment of either rotatable or flat freezing surfaces, and edged or spiked hammer devices.

A device for breaking ice according to the present invention possesses considerable advantages in comparison to the hitherto known devices of the kind. The construction is simple and the operation efficient. It may be employed for breaking ice of any thickness that may be considered in this connection, and for any hardness of ice that may be produced. The construction of the hammer devices allows for any desirable adjustment as regards length of strokes, rapidity of stroke, as well as distribution of actuations upon the ice layer.

The invention is furthermore distinguished by various other qualities as will be evident from the following detailed description of various manners of construction.

Figure 1:
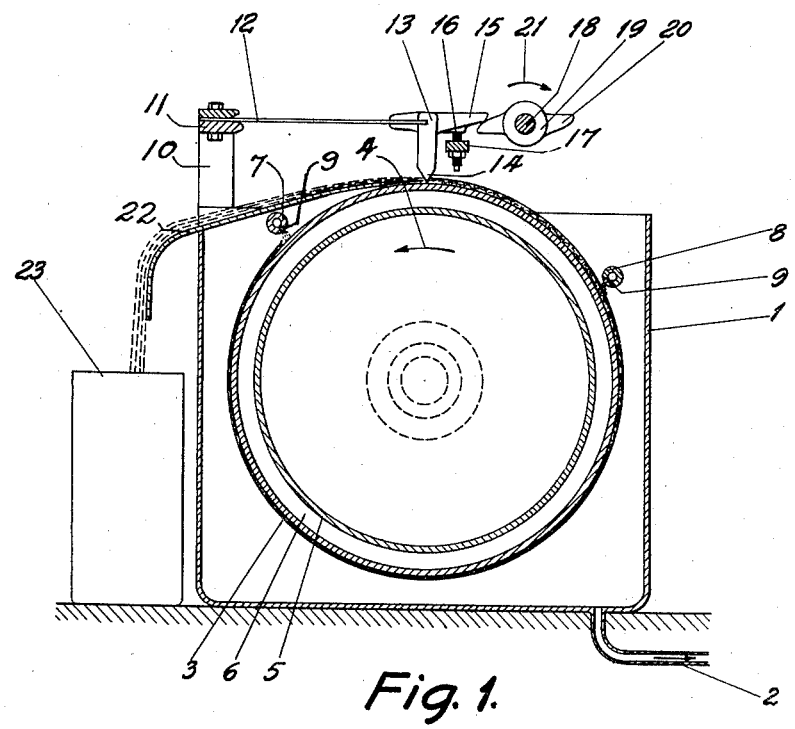
Figure 2:
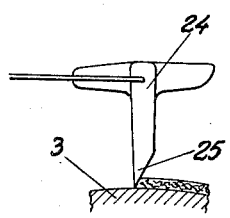
Figure 3:
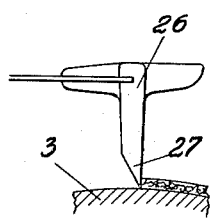
Figure 4:
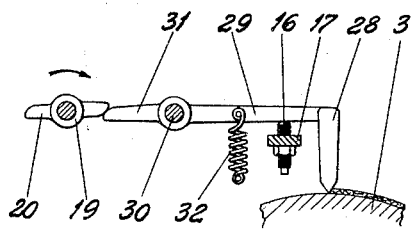
Figure 5:
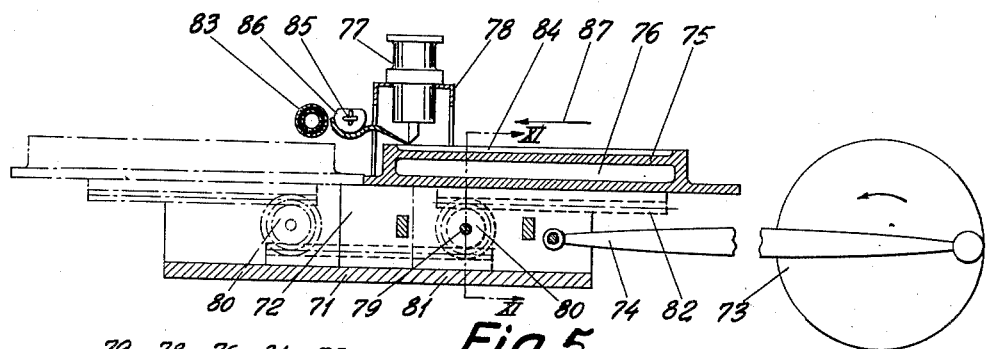
Figure 6:
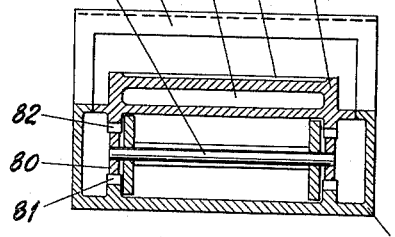
Figure 8:
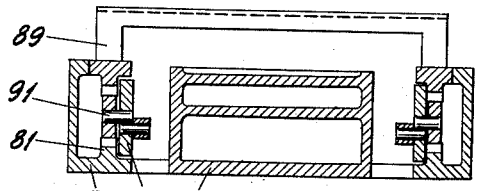
Figure 7:
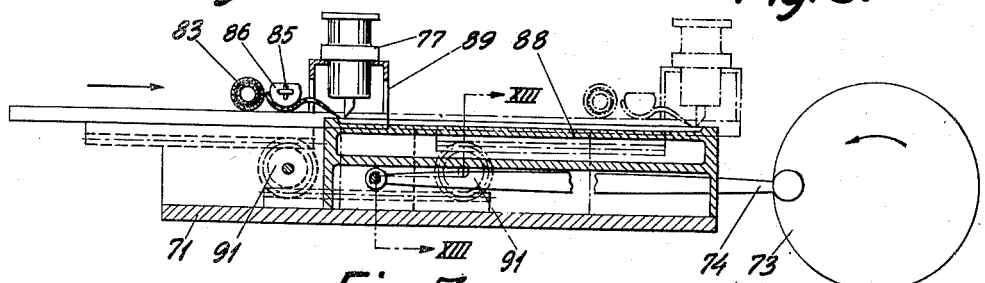

The accompanying drawing illustrates various manners of constructing a device for carrying out the method according to the invention, thus Fig. 1 is a sectional elevation of a device with rotatable cooled surface for producing broken ice according to the invention, Figs. 2, 3 and 4 details on a larger scale, Figs. 5 and 6 a device comprising a flat cooled surface for producing broken ice according to the invention seen in longitudinal and transverse section respectively, and Figs. 7 and 8 a modification of the device illustrated in Fig. 5, likewise in longitudinal and transverse section respectively.

Referring particularly to the device illustrated in Fig. 1 the machine comprises a tank that is upwardly open and at its lower end has a draining pipe 2. Within the tank there is rotatably mounted a cylindrical drum 3, which by conventional means not shown may be rotated in the direction indicated by the arrow 4. This drum is so disposed within the tank that a small portion of its circumference projects above the upper edge of the container. The drum is provided with an interior wall 5 so dimensioned that there is produced a narrow annular compartment 6 thoughout the entire length of the drum. This compartment is connected by any suitable means with a supply of a cooling medium, for instance ammonia, which in known manner is brought to evaporation for thereby imparting a sufficiently low temperature to the outer surface of the drum 3.

Within the upper end of the tank 1 and in close proximity to the drum 3 there are disposed two pipes 7 and 8, one on either side, which pipes are connected to a water supply. Each pipe extends parallel to the drum surface, and it is throughout its entire length provided with a row of apertures 9 facing the drum, to the effect that water introduced into the pipes will flow over the drum surface from the said apertures. The water issuing from the pipe 7 will thus flow over the part of the drum surface to the left in Fig. 1, where it is frozen to ice due to the effects of the cooling medium in the annular compartment 6, and as the drum is continuously rotated, there will in due course be formed a thin layer of ice over the entire drum surface. The water issuing from the pipe 8 will flow over the drum surface to the right in Fig. 1 and likewise freeze to ice on the previously formed layer of ice, which is thus gradually increased in thickness.

Above the tank 1 there is arranged a row of ice-breakers in the form of hammers, only one of which is visible in Fig. 1. This ice-breaker or hammer as it will be called in the following description, is mounted on a frame 10 attached in any suitable manner to the tank 1. This frame 10 carries a clamp member 11 between the jaws of which there is inserted the one end of a leaf spring 12 extending inwardly over the drum 3, where it carries a hammer head 13. The face of this hammer head is formed to a bevel edge 14 that is disposed immediately above the middle of the upwardly turned part of the drum surface. The hammer head has a projection 15, and immediately below this projection there is arranged an adjustment screw 16 in a holder 17 attached rigidly to any suitable part of the machine. A shaft 18 is rotatably mounted in any convenient part of the machine frame and carries a disc 19 provided with a number of cams 20, for instance as shown with two cams. These cams are so formed that during the rotation of the shaft by any conventional means in the direction indicated by the arrow 21 they will one at a time strike the hammer projection 15 to the effect that the hammer is somewhat raised, and during the continued rotation of the cam disc the hammer will again be released, and through the tension of the leaf spring 12 will rapidly descend until stopped by the adjustment screw 16. By means of this screw the hammer stroke may be so adjusted that the bevelled hammer face 14 penetrates the layer of ice formed on the drum surface but without actually striking the drum surface. The layer of ice thus struck will be broken, and owing to the rotational movement of the drum the broken ice chips will fly in the direction of rotation on a tray 22 and from there are conveyed to a collecting box 23 outside the tank 1.

The above description refers to a single hammer only, but it will be understood that the frame 10 may carry clamping members for as many hammer members as may be desired, and as required by the length of the drum 1. Likewise the shaft 18 is provided with a number of cam discs 19, 20, corresponding to the number of hammers employed.

The surplus water is removed from the tank 1 by means of the drain pipe 2.

The size of the ice chips formed may be varied by varying the speed of the drum 1 in relation to the actuation of the hammer head by the cam disc 19, 20. This cam disc may be provided with more cams than the two shown, thereby producing a more rapid actuation of the hammer head to the effect of decreasing the size of the ice chips formed.

The hardness of the ice may be varied by altering the temperature of the cooling medium.

The cams 20 on each cam disc 19 in a row may be disposed in such a manner that all the hammers in a row of hammers are actuated in succession and not simultaneously, or they are actuated groupwise in succession, or the hammers may be actuated in any predetermined sequence, to the effect that the action of the hammers on the layer of ice within a predetermined period will be distributed along the surface of the drum 1.

The hammer face shown in Fig. 1 is symmetrically bevelled with its symmetry axis at a right angle to the drum surface. By arranging the hammer in a somewhat inclined position so that the symmetry axis forms an arbitrary acute angle to the drum surface, the ice chips broken off will fly farther away from the contact point. The hammer face may, however, have other forms, for instance as shown in Fig. 2, in which the face of a hammer 24 has a bevel edge 25 the axis of which is inclined opposite the direction of rotation of the drum 3 whereas in Fig. 3 the face of a hammer 26 has a bevel edge 27 the axis of which is inclined in the direction of rotation of the said drum 3.

It is obvious that the means for producing the layer of ice may be varied in many ways which in all essentials are dependent on the size and form for operating the ice breaking members. Thus instead of employing a cylindrical drum, the layer of ice may be produced upon a flat surface beneath the hammers, which surface and hammers are relatively displaced. Such a manner of construction is exemplified in Fig. 5 and 6.

This device comprises an elongated horizontally disposed base 71 upon the upper plane surface of which a slide 72 is arranged for horizontal displacement between the ends thereof by means of a crank device 73 rotated by any suitable means, and which is connected to the slide through a connection rod 74. This slide carries on its upper surface a hollow plate member 75, the cavity 76 of which is connected by conventional means to a supply of a cooling medium, for instance brine, that flows through the said cavity for imparting to the upper wall thereof a considerable cooling effect. Above the plate member 75 there is arranged a row of ice breaking members 77 which may be of any of the above described constructions, and which members are mounted within a frame device 78 attached to the base 71.

Transversely disposed within the slide there is a rotatable shaft 79 which at each end outside the slide walls carries a toothed wheel 80 each engaging partly a rack 81 attached to the base 71, and partly a rack 82 attached to the lower side of the plate member 75. Upon being actuated by the crank 73, 74 the slide 72 will be imparted a reciprocal movement over the base 71, causing the toothed wheel 80 to revolve and thus actuating the hollow plate member 75 to a corresponding reciprocal movement in relation to the slide. The extreme displacement of the hollow plate member 75 from the position shown in full lines is indicated in dot-and-dash lines in Fig. 5.

The water to be frozen is supplied from a stationary pipe 83 arranged transversely to the hollow plate member 75, which in the following will be called the freezing plate. The pipe has apertures facing the freezing plate surface for distributing water over this surface which along the sides has upwardly extending edges 84 to prevent the water from running off. A conveyor 85 within a trough 86 serves to remove the broken ice from the freezing plate 75 to a conveniently disposed collecting box not shown in the drawing.

This device operates in the following manner: The cooling medium is introduced to the interior of the freezing plate 75, and when a suitable temperature has been attained water is applied from the pipe 83 to the freezing surface 75 where it is immediately frozen to ice. The crank device 73, 74 is set in motion and the slide 72 actuates the freezing plate 75 to movement for instance in the direction indicated by the arrow 87 in Fig. 5. The ice breaking implement 77 is operated in accordance with its construction for breaking the layer of ice in a similar manner as described in connection with the device illustrated in Fig. 1. The ice chips are caught in the trough 86 and removed by means of the conveyor 85. During the progression of the freezing plate, water is applied to its surface so as to continually produce a layer of ice that is subsequently subjected to the activity of the ice breaking members 77. To avoid obscurity the row of ice breaking members 77 are not shown in Fig. 6.

The above described flat device may be modified, for instance as shown in Figs. 7 and 8, in which like denominations are employed for parts corresponding to the parts of the device shown in Figs. 5 and 6. Here the base 71 carries a rigid freezing plate 88 and a displaceable frame 89 carrying the ice breaking members 77, which are omitted in Fig. 8 to avoid obscurity. A crank device 73 is by means of a connection arm 74 connected to a carrier 90 on which a toothed wheel 91 is journalled, which toothed wheel engages as well a rack 81 on the base 71 as a rack attached to the lower side of the frame 89 through which means this frame is imparted a reciprocal movement in relation to the freezing plate 88. Water is applied to the freezing plate from a water pipe 83, and the broken ice chips removed by means of a conveyor 85 in a trough 86 in the same manner as described previously. This device operates essentially in the same manner as that shown in Fig. 5 excepting that in the device shown in Fig. 7 the ice breaking members are moved in relation to the freezing plate instead of the freezing plate moving in relation to the ice breaking members.

I claim:

1. A device for producing ice chips in fragments, comprising a movable member having a smooth surface, means to cool this surface below the freezing temperature, means for supplying water to the said surface for producing a progressively thickening sheet of ice thereon, chisel members to break the ice sheet arranged for reciprocating movement perpendicularly to the ice sheet, resilient members tensioned to normally press said chisel members toward the movable member, means for actuating the said resiliently mounted chisel members to perform a series of strokes in rapid succession on the ice sheet, and means for removing the broken ice from the movable member.

2. A device for producing ice chips in fragments, comprising a movable member having a smooth surface, means to cool this surface below the freezing temperature, means for supplying water to the said surface for producing a progressively thickening sheet of ice thereon, a plurality of chisel members arranged in a row above the ice sheet transversely to the direction of movement of the movable member, resilient members tensioned to normally press the chisel members toward the movable member, actuating means coacting with the resiliently mounted chisel members for alternately moving the chisel members in groups away from the movable member and releasing the same to perform a series of reciprocating strokes perpendicularly to the surface of the movable member for breaking the sheet of ice thereon, and means for removing the broken ice from the movable member.

3. A device for producing ice chips in fragments, comprising a water tank, a rotatable drum having a smooth surface, and partly submerged in the water of the water tank, means to cool the drum surface below freezing temperature for producing a progressively thickening sheet of ice on the drum surface, chisel members arranged for reciprocating movement radially to the drum surface, resilient members tensioned to normally press the said chisel members toward the drum, actuating means coacting with the resiliently mounted chisel members for alternately moving the chisel member away from the drum and releasing the same to perform a series of strokes in rapid succession, and means for removing the broken ice from the drum.

4. A device for producing ice chips in fragments, comprising a base member, a hollow table, means for cooling the table top below the freezing temperature, means for supplying water to the table top for the formation thereon of a progressively thickening sheet of ice, means for the relative displacement longitudinally of the said table and base, chisel members arranged for reciprocating movement perpendicularly to the table surface, resilient means for normally pressing said chisel members toward the table surface and actuating means coacting with the resiliently mounted chisel members for alternately moving said chisel members away from the drum and releasing the same to perform a series of strokes in rapid succession to break the sheet of ice on the table into minute particles, and means for removing the broken ice from the table.

5. A device for producing ice chips in fragments, comprising a movable member having a smooth surface, means to cool this surface below the freezing temperature, means for supplying water to the said surface for producing a progressively thickening sheet of ice thereon, chisel members to break the ice sheet arranged for reciprocating movement perpendicularly to the surface of the movable member, a leaf spring connecting each chisel to a rigid part of the device, means for actuating the chisel members to perform a series of strokes in rapid succession on the ice sheet, and means for removing broken ice from the movable member.

SVEND AXEL JØRGEN MANSTED.

REFERENCES CITED

The following references are of record in the file of this patent:

UNITED STATES PATENTS

| Number | Name | Date |
|---|---|---|
| 1,963,842 | Gay | June 18, 1934 |
| 2,226,559 | Groom | Dec. 31, 1940 |
| 2,253,397 | Reeves | Aug. 19, 1941 |
| 2,282,525 | Maguire | May 12, 1942 |
| 2,308,541 | Raver | Jan. 19, 1943 |
| 2,418,434 | Storer | Apr. 1, 1947 |